June 19, 1923.

J. G. PETTERSSON 1,459,551

FIRE PROTECTOR FOR MOVING PICTURE MACHINES

Filed Oct. 25, 1921

Inventor:-
Johan Gottfrid Pettersson
by attorneys

Patented June 19, 1923.

1,459,551

UNITED STATES PATENT OFFICE.

JOHAN GOTTFRID PETTERSSON, OF BORGHOLM, SWEDEN.

FIRE PROTECTOR FOR MOVING-PICTURE MACHINES.

Application filed October 25, 1921. Serial No. 510,388.

*To all whom it may concern:*

Be it known that I, JOHAN GOTTFRID PETTERSSON, a subject of the King of Sweden, and resident of Vestra Kyrkogatan 90, Borgholm, in the Kingdom of Sweden, have invented certain new and useful Improvements in Fire Protectors for Moving-Picture Machines, of which the following is a specification, reference being had therein to the accompanying drawing.

This invention relates to a fire-protector for moving-picture machines which in order to prevent the film from catching fire is provided with a screen, located between the source of light and the path of the film, said screen being movable and open when the film is fed. The stop-mechanism of said screen is connected with a movable member engaging the film, which member when the tension of the film is lessened, for example if the latter bursts or if the perforation is faulty, shifts its position and releases the screen, so that the latter shuts off the light.

The invention is characterized thereby that said member is so arranged that it engages the film between two coaxially mounted and synchronously rotating feeder-rolls or toothed feeder-rings for the film. The advantage of my invention as compared with known means of this kind, in which said member engages the film anywhere between two feeder-rolls, is that the member lies perfectly immovable when the film is fed because the film is slightly but quite sufficiently supported by the feeder-rolls in this point, so that it does not flinch when being fed. Consequently the stop-mechanism for the screen may be so arranged that a slight movement of said member will be enough for releasing the stop-mechanism, whereby the sensibility of the device is greatly increased.

Figure 1:
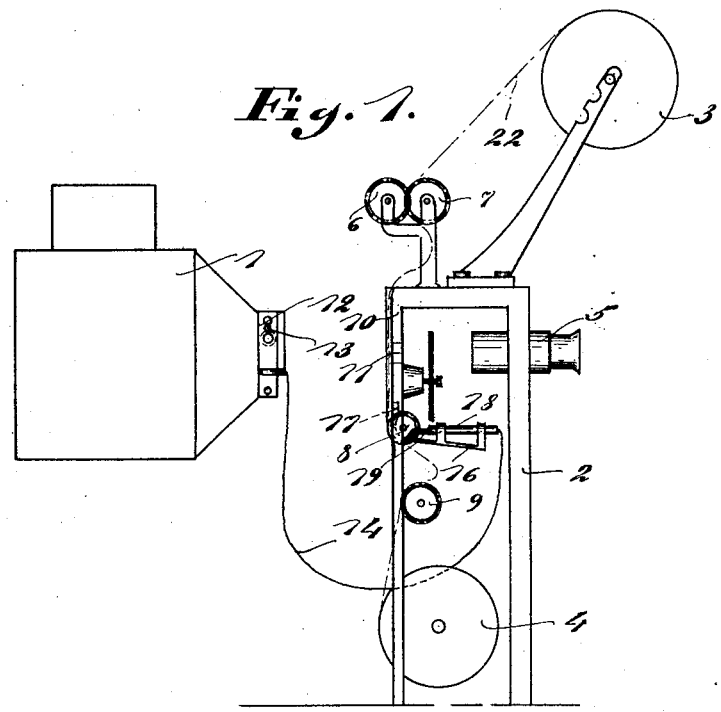
Figures 2, 3:
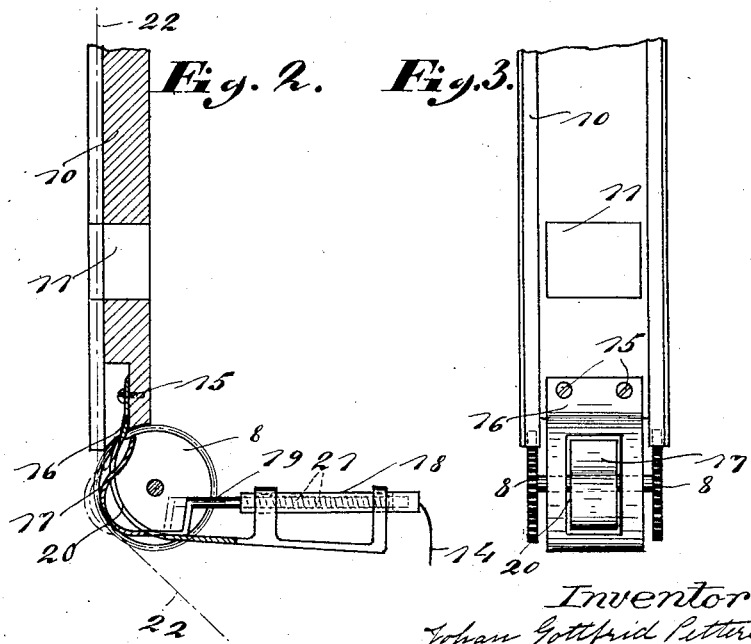

In the accompanying drawing, showing an illustrative embodiment of this invention, Fig. 1 is a diagram of the whole apparatus and Figs. 2 and 3 detail-views, drawn on a larger scale.

1 represents the illuminating apparatus, 2 is the stand, supporting the feeder-mechanism, the film-rolls 3, 4 and the objective 5. 6, 7, 8 and 9 represent the feeder-rolls and 10 is the frame, along which the film 22 is fed past the opening 11 in that portion of the stand which is turned towards the illuminating apparatus, through which opening the cone of rays passes on to the objective. Immediately in front of the lenses of the illuminating apparatus is placed a screen, as for example an ordinary shutter 12, comprising a spring-actuated disc, slidably mounted in a frame and locked in opened position by means of a pawl 13, which may be released by means of a wire 14. When closed said shutter completely shuts off the light from the apparatus 1.

The movement necessary for releasing the pawl 13 is effected according to the present invention by means of the following arrangement. A holder 16 for said shifting member, which in the illustrated form of the invention comprises a chape 17 (Figs. 2 and 3), is by means of screws attached to the lower portion of the frame 10. The holder is made of sheet-metal and mounted between two feeder-rolls or toothed rings 8, coaxially mounted and synchronously rotating. Said holder is bent backwards from the path of the film and its rear portion is provided with two bearings in which a sleeve 18 is mounted. A spindle 19 projecting from the chape is slidably mounted in said sleeve. The leg of the chape 17 which is turned against the path of the film is rounded off and is projected in the former through an opening 20 in the holder by means of a spring 21 in the sleeve 18 when the film is not placed in its path. On the other hand if the film is ready to be fed the slight tension in the same and the friction between the teeth of the feeder-rolls 8 and the band is sufficient to keep the chape 17 pressed back against the tension of the spring 21. As long as the chape remains in this position the pawl 13 can not be released and thus the shutter remains open. On the other hand if the film should burst the chape 17 snaps out in the path of the film through the opening 20. The movement of the chape is immediately transferred to the shutter in the known way by means of the wire 14 which is attached to the spindle 19, the pawl is released and the shutter is closed.

The means by which the film controls the action of the screen or especially in this case the action of the shutter, evidently may be arranged in many different ways. The shifting member, instead of being slidable may for instance be movable and the movement arising from the bursting of the film transferred to the stop-mechanism of the screw.

Having now described my invention, what

I claim as new and desire to secure by Letters Patent is:

1. In a moving picture machine, the combination with an illuminating apparatus, a shutter therefor, mechanism for operating said shutter, and a pair of toothed feed rolls coaxially mounted to control the movement of the film, of a device connected to the shutter operating mechanism, said device comprising a holder located between said rolls and having an opening therethrough, a sleeve carried by said holder, and a spring actuated spindle mounted in said sleeve and adapted to frictionally engage the film through the opening in the holder, whereby the movement of the spindle will actuate the shutter operating mechanism.

2. In a moving picture machine, the combination with an illuminating apparatus, a shutter therefor, mechanism for operating said shutter, and a pair of toothed feed rolls coaxially mounted to control the movement of the film, of a device connected to the shutter operating mechanism, said device comprising a holder located between said rolls and having an opening therethrough, a sleeve carried by said holder, and a spring actuated spindle mounted in said sleeve, said spindle having a curved end adapted to frictionally engage the film through the opening in the holder, whereby the movement of the spindle will actuate the shutter operating mechanism.

In witness whereof, I have hereunto signed my name.

JOHAN GOTTFRID PETTERSSON.